United States Patent Office
2,988,550
Patented June 13, 1961

2,988,550
NEW PYRIMIDINE DERIVATIVES
Wilson Shaw Waring, Manchester, England, assignor to Imperial Chemical Industries Limited, London, England, a corporation of Great Britain
No Drawing. Filed Sept. 22, 1959, Ser. No. 841,457
Claims priority, application Great Britain Jan. 30, 1957
6 Claims. (Cl. 260—260)

This invention relates to pyrimidine derivatives and more particularly it relates to certain new pyrimidine derivatives which I have found to possess anticonvulsant properties. This application is a continuation-in-part application of my co-pending applications Serial No. 708,394, filed January 13, 1958, and Serial No. 763,490, filed September 26, 1958, both now abandoned.

According to the invention I provide pyrimidine derivatives which are of the formula:

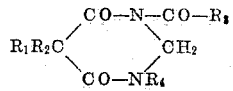

wherein $R_1$ is selected from the group consisting of phenyl, halo-phenyl and lower alkyl radicals, $R_2$ stands for a lower alkyl radical, $R_3$ is selected from the group consisting of hydrogen, lower alkyl, halo-substituted lower alkyl, lower alkenyl, phenyl, phenylalkyl and phenylalkenyl radicals, and $R_4$ is selected from the group consisting of hydrogen and the group —$COR_5$, wherein $R_5$ is selected from the group consisting of hydrogen, lower alkyl, halo-substituted lower alkyl, lower alkenyl, phenyl and phenylalkenyl radicals, provided that $R_3$ and $R_4$ do not both stand for hydrogen at the same time.

According to a preferred feature of the invention I provide pyrimidines of the above stated formula wherein $R_1$ is selected from the group consisting of phenyl and halo-phenyl radicals, $R_2$ stands for a lower alkyl radical, $R_3$ is selected from the group consisting of hydrogen, lower alkyl and phenyl radicals, and $R_4$ is selected from the group consisting of hydrogen and the group —$COR_5$, wherein $R_5$ is selected from the group consisting of hydrogen, lower alkyl and phenyl radicals, provided that $R_3$ and $R_4$ do not both stand for hydrogen at the same time.

Particularly valuable compounds are 1:3-diformyl-5-ethyl-5-phenylhexahydropyrimidine-4:6-dione, 1:3-diacetyl-5-ethyl-5-phenylhexahydropyrimidine-4:6-dione, 1:3-dipropionyl-5-ethyl-5-phenylhexahydropyrimidine-4:6-dione, 1-benzoyl-5-ethyl-5-phenylhexahydropyrimidine-4:6-dione and 1:3-dibenzoyl-5-ethyl-5-phenylhexahydropyrimidine-4:6-dione.

The pyrimidine derivatives of the formula:

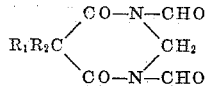

wherein $R_1$ and $R_2$ have the meaning stated above may be obtained by the oxidation of the corresponding methylol derivatives of the formula:

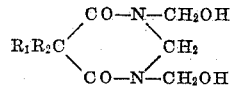

wherein $R_1$ and $R_2$ have the meaning stated above.

The said oxidation may conveniently be carried out using chromic anhydride as the oxidising agent. The oxidation may be carried out in the presence of an inert diluent or solvent for example acetic acid.

The methylol derivatives used as starting material may be prepared by interaction of compounds of the formula:

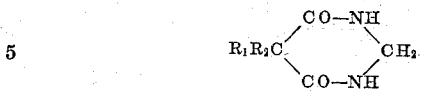

wherein $R_1$ and $R_2$ have the meaning stated above, with formaldehyde preferably in the presence of alkali.

The pyrimidine derivatives of the formula:

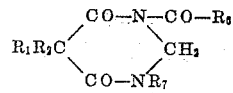

wherein $R_1$ and $R_2$ have the meaning stated above, $R_6$ is selected from the group consisting of lower alkyl, halo-substituted lower alkyl, lower alkenyl, phenyl, phenylalkyl and phenylalkenyl radicals, and $R_7$ is selected from the group consisting of hydrogen and the group —$COR_8$, wherein $R_8$ is selected from the group consisting of lower alkyl, halo-substituted lower alkyl, lower alkenyl, phenyl and phenylalkenyl radicals, may be obtained by the acylation of pyrimidine derivatives of the formula:

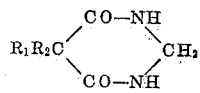

wherein $R_1$ and $R_2$ have the meaning stated above.

The said acylation may conveniently be brought about by known means, for example by treatment of the said pyrimidine derivatives, preferably under the action of heat, with acylating agents. Suitable acylating agents include for example acid halides, for example benzoyl chloride, and acid anhydrides, for example acetic anhydride, propionic anhydride, butyric anhydride, crotonic anhydride and benzoic anhydride. The reaction may if desired be carried out in a suitable solvent or diluent medium which may be an excess of the acylating agent used. Other suitable solvents for the reaction are inert hydrocarbon solvents, for example xylene. Still other suitable solvents for the reaction are those which have the properties of a solvent and also an acid-acceptor, for example pyridine.

It is to be understood that the process, in the case where $R_7$ stands for the group —$COR_8$, may be carried out, if desired, in two stages; acylation to give the mono-acyl derivative followed by acylation with a different acylating agent to give the di-acyl derivative, in which the two acyl groups are different.

As stated above, the compounds with which this invention is concerned possess anticonvulsant properties and they are useful in the treatment of epilepsy particularly grand mal epilepsy.

The invention is illustrated but not limited by the following examples in which the parts are by weight:

*Example 1*

75 parts of 5-ethyl-5-phenylhexahydropyrimidine-4:6-dione and 200 parts of acetic anhydride are boiled together under reflux for 30 minutes. The mixture is cooled and filtered. The solid residue consists of 1:3-diacetyl-5-ethyl-5-phenylhexahydropyrimidine-4:6-dione which crystallises from methanol in large colourless prisms of M.P. 125–126° C.

*Example 2*

10 parts of 5-ethyl-5-phenylhexahydropyrimidine-4:6-dione and 25 parts of propionic anhydride are boiled together under reflux for 30 minutes. The excess propionic anhydride is removed by distillation under reduced pressure, and the residue is washed with petroleum ether (B.P. 40–60° C.). There is obtained 1:3-dipropionyl-5-ethyl - 5 - phenyl - hexahydropyrimidine - 4:6 - dione which crystallises from methanol as large colourless prisms, M.P. 95–96° C.

*Example 3*

7 parts of 5-ethyl-5-phenylhexahydropyrimidine-4:6-dione and 20 parts of n-butyric anhydride are heated together at 160° C. for 70 minutes. The mixture is cooled and filtered and the solid residue is washed with petroleum ether (B.P. 40–60° C.). It is then recrystallised from petroleum ether (B.P. 40–60° C.) to give 1:3-di-n-butyryl - 5 - ethyl - 5 - phenyl - hexahydropyrimidine-4:6-dione as colourless prisms, M.P. 83–84° C.

*Example 4*

8 parts of 5-ethyl-5-phenylhexahydropyrimidine-4:6-dione and 17 parts of crotonic anhydride are mixed and heated at 160° C. for 1 hour. Crotonic acid and excess crotonic anhydride are removed by distillation under reduced pressure, and the residue is crystallised from methanol. 1:3 - dicrotonyl - 5 - ethyl - 5 - phenylhexahydropyrimidine-4:6-dione is obtained as colourless prisms, M.P. 91–92° C.

*Example 5*

8.8 parts of 5-ethyl-5-phenylhexahydropyrimidine-4:6-dione and 12 parts of benzoyl chloride are heated together at 170° C. for 45 minutes. The mixture is cooled to 60° C., triturated with petroleum ether (B.P. 80–100° C.) and the mixture is filtered. The solid residue is washed with petroleum ether (B.P. 80–100° C.) and is then stirred with cold methanol and the mixture is filtered. The solid residue is then crystallised from methanol and there is obtained 1-benzoyl-5-ethyl-5-phenylhexahydropyrimidine-4:6-dione as colourless prisms, M.P. 191–192° C.

*Example 6*

22 parts of 5-ethyl-5-phenylhexahydropyrimidine-4:6-dione and 31 parts of phenylacetyl chloride are heated together at 170° C. for 15 minutes. The mixture is then cooled to 100° C., dissolved in petroleum ether (B.P. 80–100° C.) and cooled to room temperature. The solid is filtered off, washed with petroleum ether (B.P. 80–100° C.), stirred with cold methanol and the mixture filtered. The solid residue is then crystallised from methanol and there is obtained 1-phenylacetyl-5-ethyl-5-phenylhexahydropyrimidine-4:6-dione as colourless prisms, M.P. 133–134° C.

*Example 7*

4.4 parts of 5-ethyl-5-phenylhexahydropyrimidine-4:6-dione and 6.6 parts of cinnamoyl chloride are heated together at 170° C. for 15 minutes. The mixture is cooled, stirred with hot petroleum ether (B.P. 80–100° C.) and filtered. The solid residue is washed with petroleum ether (B.P. 80–100° C.), stirred with cold methanol and the mixture is filtered. The solid residue is then crystallised from glacial acetic acid and there is obtained 1:3-dicinnamoyl - 5 - ethyl - 5 - phenylhexahydropyrimidine - 4:6-dione as colourless prisms, M.P. 172–173° C.

*Example 8*

2.2 parts of 5-ethyl-5-phenylhexahydropyrimidine-4:6-dione and 5.1 parts of chloracetic anhydride are heated together at 145° C. for 30 minutes. Chloracetic acid and excess chloracetic anhydride are removed by distillation under reduced pressure, the residue is stirred with petroleum ether (B.P. 60–80° C.) and the mixture filtered. The solid residue is then washed with petroleum ether (B.P. 60–80° C.), and is then stirred with cold methanol and the mixture is filtered. The solid residue is then crystallised from ethanol and there is obtained 1:3-di-(chloracetyl) - 5 - ethyl - 5 - phenylhexahydropyrimidine-4:6-dione as colourless prisms, M.P. 149–150° C.

*Example 9*

11 parts of 5-ethyl-5-phenylhexahydropyrimidine-4:6-dione and 22.5 parts of benzoic anhydride are heated together at 190° C. for 5 hours. The mixture is cooled, dissolved in an equal volume of hot methanol, cooled, and the solid is filtered off. The filtrate is diluted with water and the mixture filtered. The solid residue is then crystallised from methanol and there is obtained 1:3-dibenzoyl - 5 - ethyl - 5 - phenylhexahydropyrimidine - 4:6 - dione as colourless prisms, M.P. 149–150° C.

*Example 10*

10 parts of 5-(m-chlorophenyl)-5-ethylhexahydropyrimidine-4:6-dione and 50 parts of acetic anhydride are boiled together under reflux for 40 minutes. Acetic acid and excess acetic anhydride are removed by distillation under reduced pressure, the residue stirred with petroleum ether (B.P. 40–60° C.) and the mixture is filtered. The solid residue is then crystallised from methanol and there is obtained 1:3-diacetyl-5-(m-chlorophenyl)-5-ethylhexahydropyrimidine-4:6-dione as colourless prisms, M.P. 92–93° C.

*Example 11*

1 part of 5:5-diethylhexahydropyrimidine-4:6-dione and 2.5 parts of propionic anhydride are boiled together under reflux for 30 minutes. The excess propionic anhydride is removed by distillation under reduced pressure, the residue is dissolved in petroleum ether (B.P. 40–60° C.) and cooled. The solid residue is recrystallised from petroleum ether (B.P. 40–60° C.) by strong cooling, and there is obtained 5:5-diethyl-1:3-dipropionylhexahydropyrimidine-4:6-dione as colourless prisms, M.P. 69–70° C.

*Example 12*

9 parts of 1-benzoyl-5-ethyl-5-phenylhexahydropyrimidine-4:6-dione are suspended in 90 parts of dry xylene containing 3.15 parts of acetic anhydride, and the mixture boiled under reflux for 45 minutes. The mixture is then cooled, and diluted with petroleum ether (B.P. 40–60° C.). It is then filtered. The filtrate is evaporated to dryness under reduced pressure, the residue stirred with petroleum ether (B.P. 40–60° C.) and the mixture is filtered. The solid residue is then crystallised from methanol and there is obtained 1-acetyl-3-benzoyl-5-ethyl-5-phenylhexahydropyrimidine - 4:6 - dione as colourless prisms, M.P. 129–130° C.

*Example 13*

A mixture of 4.1 parts of acetic anhydride, 2.2 parts of 5 - ethyl - 5 - phenylhexahydropyrimidine - 4:6 - dione and 10 parts of pyridine is heated at 100° C. for 8 hours, cooled and poured into ice-water. The mixture is allowed to stand for one hour and is then filtered. The solid residue is crystallised from ethanol giving 1:3-diacetyl-5-ethyl - 5 - phenylhexahydropyrimidine - 4:6 - dione as colourless prisms, M.P. 125–126° C.

*Example 14*

2.8 parts of 1:3-dimethylol-5-ethyl-5-phenylhexahydropyrimidine-4:6-dione are added to 40 parts of a 5% solution of chromium trioxide in 95% acetic acid. The reaction mixture is shaken occasionally and the temperature is allowed to rise to a maximum of 50° C. The mixture is then allowed to cool to room temperature and is poured into water and the mixture filtered. The solid residue is crystallised from ethanol and there is thus obtained 1:3-diformyl-5-ethyl-5-phenylhexahydropyrimidine-4:6-dione as a colourless crystalline solid, M.P. 152° C.

The 1:3 - dimethylol-5-ethyl-5-phenylhexahydropyrimidine-4:6-dione used as starting material may be prepared as follows:

A mixture of 218 parts of 5-ethyl-5-phenylhexahydropyrimidine-4:6-dione, 1500 parts of water, 900 parts of 37% aqueous formaldehyde solution and 10 parts of potassium carbonate are heated together at 85–90° C. until a homogeneous solution is obtained. 5 parts of absorbent charcoal are then added and the mixture is filtered. The filtrate is cooled and the mixture is filtered. The solid residue is dried at 80° C. for 22 hours and there is thus obtained 1:3-dimethylol-5-ethyl-5-phenyl-hexahydropyrimidine-4:6-dione, M.P. 164° C. with decomposition.

What I claim is:

1. Pyrimidine derivatives having the formula:

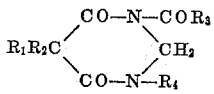

wherein $R_1$ is selected from the group consisting of phenyl, halo-phenyl and lower alkyl radicals, $R_2$ stands for a lower alkyl radical, $R_3$ is selected from the group consisting of hydrogen, lower alkyl, halo-substituted lower alkyl, lower alkenyl, phenyl, benzyl and styryl radicals, and $R_4$ is selected from the group consisting of hydrogen and the group —$COR_5$, wherein $R_5$ is selected from the group consisting of hydrogen, lower alkyl, halo-substituted lower alkyl, lower alkenyl, benzyl and styryl radicals, provided that $R_3$ and $R_4$ do not both stand for hydrogen at the same time.

2. 1:3-diformyl-5-ethyl - 5 - phenylhexahydropyrimidine-4:6-dione.

3. 1:3-diacetyl - 5 - ethyl - 5 - phenylhexahydropyrimidine-4:6-dione.

4. 1:3-dipropionyl-5-ethyl - 5 - phenylhexahydropyrimidine-4:6-dione.

5. 1-benzoyl-5-ethyl - 5 - phenylhexahydropyrimidine-4:6-dione.

6. 1:3-dibenzozyl-5-ethyl - 5 - phenylhexahydropyrimidine-4:6-dione.

References Cited in the file of this patent

Burrows et al.: Jour. Chem. Soc., vol. 91, pages 269–271 (1907).